US006855792B2

(12) United States Patent
Speier et al.

(10) Patent No.: US 6,855,792 B2
(45) Date of Patent: Feb. 15, 2005

(54) CROSS-LINKING AGENTS AND THERMOSETTING PAINTS

(75) Inventors: Peter Speier, Marl (DE); Friedrich Plogmann, Castrop-Rauxel (DE); Rainer Lomoelder, Muenster (DE); Andreas Wenning, Nottuln (DE); Emmanouil Spyrou, Marl (DE)

(73) Assignee: Degussa AG, Duesseldorf (DE)

( * ) Notice: Subject to any disclaimer, the term of this patent is extended or adjusted under 35 U.S.C. 154(b) by 426 days.

(21) Appl. No.: 09/772,943

(22) Filed: Jan. 31, 2001

(65) Prior Publication Data

US 2002/0103286 A1 Aug. 1, 2002

(30) Foreign Application Priority Data

Dec. 4, 2000 (DE) .......................................... 100 60 327

(51) Int. Cl.[7] .............................................. C08G 18/80
(52) U.S. Cl. ............................. 528/28; 528/38; 528/45; 525/440; 427/387; 428/423.1; 252/182.14; 556/414
(58) Field of Search ............................. 528/28, 38, 45; 525/440; 427/387; 428/423.1; 252/182.14; 556/414

(56) References Cited

U.S. PATENT DOCUMENTS

| 5,998,504 | A | * | 12/1999 | Groth et al. |
| 6,281,322 | B1 | * | 8/2001 | Groth et al. |
| 6,288,198 | B1 | * | 9/2001 | Mechtel et al. |
| 6,492,482 | B2 | * | 12/2002 | Lomoelder et al. |
| 6,500,548 | B2 | * | 12/2002 | Wenning |

FOREIGN PATENT DOCUMENTS

| DE | 197 15 426 A1 | 10/1998 |
| EP | 0 096 250 A1 | 12/1983 |
| EP | 0 814 105 A2 | 12/1997 |
| EP | 0 949 284 A1 | 10/1999 |

* cited by examiner

*Primary Examiner*—Rachel Gorr
(74) *Attorney, Agent, or Firm*—Oblon, Spivak, McClelland, Maier & Neustadt, P.C.

(57) ABSTRACT

The present invention relates to new cross-linking agents and thermosetting paints, which lead to improved properties such as scratch resistance of cured thermosetting paints or exhibit good solubility.

11 Claims, No Drawings

CROSS-LINKING AGENTS AND THERMOSETTING PAINTS

CROSS REFERENCES TO RELATED APPLICATIONS

This application claims priority to German Patent Application No. 10060327.0, filed on Dec. 4, 2000, which is incorporated herein by reference in its entirety.

BACKGROUND OF THE INVENTION

1. Field of the Invention

The present invention relates to cross-linking agents and methods for preparing cross-linking agents. The present invention also relates to thermosetting resins and methods of preparing thermosetting resins. The present invention further relates to articles with a coating layer and methods of preparing an article with a coating layer.

2. Discussion of the Background

Blocked polyisocyanates and the use thereof in thermosetting one-component polyurethane systems are known. They impart to top clear coats significantly better resistance to environmental influences, especially acid rain, than is the case in systems comprising cross-linking aminoplastic resins. Among other applications, blocked polyisocyanates are also used proportionally in combination with aminoplastic resins as cross-linking components in "hybrid systems." Blocked polyisocyanates also have considerable importance in the field of thermosetting powder lacquers.

Polyisocyanates modified with secondary aminosilanes are also known. For example, aminopropyltrialkoxysilanes modified with maleic or fumaric acid esters may be reacted with isocyanates in order to achieve better adhesion with less $CO_2$ evolution than is the case with sealing compounds based on pure isocyanate prepolymers (see European Patent No. 596360 and U.S. Pat. No. 6,005,047). Structurally related adducts are also used as a hardener component in aqueous 2-component PUR lacquers (see European Patent Nos. 872499 and 949284).

SUMMARY OF THE INVENTION

What is common to all applications is that the resin components used still contain free isocyanate groups, and therefore are unsuitable for thermosetting 1-component systems as are commonly used in the automobile industry.

One disadvantage of thermosetting 1-component PUR systems based on blocked polyisocyanates is the considerable susceptibility of the cured clear coat to scratching. This is an important consideration for the resistance of top clear coat to washing jets in automobile coatings.

Another disadvantage of some blocked polyisocyanates is their limited solubility in common paint solvents. This is characterized by a considerable crystallization tendency among other problems.

Accordingly, it is one object of the present invention to provide novel cross-linking agents.

It is another object of the present invention to provide novel methods for preparing such cross-linking agents.

It is another object of the present invention to provide novel thermosetting paints which contain such a cross-linking agent.

It is another object of the present invention to provide novel methods for preparing such thermosetting paints.

It is another object of the present invention to provide articles with a coating layer obtained by curing such a thermosetting paint.

It is another object of the present invention to provide a method for preparing such articles with a coating layer obtained by curing such a thermosetting paint.

It is another object of the present invention to provide novel thermosetting paints, which lead to improved properties such as scratch resistance of cured thermosetting paints, especially clear coats, or exhibit good solubility.

It is another object of the present invention to provide thermosetting paints, especially clear coats, having a level of properties comparable to that of PUR coatings together with significantly better scratch resistance by using novel cross-linking agents. In this connection it is intended either to improve the scratch resistance of the clear coat in itself or else to improve the ability of the clear coat to recover from mechanical damage by what is known as reflow behavior.

It is a further object of the present invention to provide improved solubility or reduced crystallization tendency of the cross-linking agents by the use of blocking agents that are critical with respect to this property.

These and other objects, which will become apparent during the following detailed description, have been achieved by the inventors' discovery of cross-linking agents for thermosetting resins formed from the following starting components:

(A) at least one aliphatic and/or cycloaliphatic polyisocyanate having 2 to 6 —NCO functional groups;

(B) at least one secondary 3-aminopropyltrialkoxysilane, with which 1 to 90 mol % of the originally free isocyanate groups of the polyisocyanate have been reacted; and (C) at least one blocking agent, with which 10 to 99 mol % of the originally free isocyanate groups of the polyisocyanate have been reacted, and the molar proportions of the reacted isocyanate groups add up to at least 95 mol %.

The inventors have surprisingly discovered that such blocked derivatives have significantly better solubility, than is the case of the unmodified, pure blocked polyisocyanates, and that the use of particular blocking agents is critical with respect to this property.

DETAILED DESCRIPTION OF THE PREFERRED EMBODIMENTS

Thus, in a first embodiment, the present invention provides cross-linking agents for thermosetting paints formed from the following starting components:

(A) at least one aliphatic and/or cycloaliphatic polyisocyanate having 2 to 6 —NCO functional groups;

(B) at least one secondary 3-aminopropyltrialkoxysilane, with which 1 to 90 mol % of the originally free isocyanate groups of the polyisocyanate have been reacted; and (C) at least one blocking agent, with which 10 to 99 mol % of the originally free isocyanate groups of the polyisocyanate have been reacted, and the molar proportions of the reacted isocyanate groups add up to at least 95 mol %.

Thus, the present cross-linking agents are derivatives of a polyisocyanate, which originally contained 2 to 6 —NCO functional groups, and in which essentially all of the —NCO functional groups have been reacted with either a secondary 3-aminopropyltrialkoxysilane or a blocking agent which is not a secondary 3-aminopropyltrialkoxysilane. In particular, 1 to 90 mol %, preferably 25 to 75 mol %, more preferably 40 to 60 mol %, of the originally free isocyanate groups of the polyisocyanate are reacted with the secondary 3-aminopropyltrialkoxysilane, while 10 to 99 mol %, preferably 25 to 75 mol %, more preferably 40 to 60 mol %, of the originally free isocyanate groups of the polyisocyanate are reacted with the blocking agent which is not a secondary 3-aminopropyltrialkoxysilane.

Although it is especially preferred that the present cross-linking agents contain no residual isocyanate groups, the present cross-linking agents may contain a small amount of residual isocyanate groups. Thus, the total molar proportion of the reacted isocyanate groups may be 95 to 100 mol %, preferably 97 to 100 mol %, more preferably 99 to 100 mol %, even more preferably 99.9 to 100 mol %.

The polyisocyanate of component (A) is preferably based on hexamethylene diisocyanate (HDI); isophorone diisocyanate (IPDI); bis(4-isocyanatocyclohexyl)-methane ($H_{12}$-MDI); tetramethylxylylene diisocyanate (TMXDI); 1,3-bis(isocyanatomethyl)cyclohexane (1,3-H-XDI); 2,2,4-trimethyl-1,6-diisocyanatohexane and 2,4,4-trimethyl-1,6-diisocyanatohexane (TMDI); 2-methylpentene diisocyanate-1,5 (MPDI); norbornyl diisocyanate (NBDI); lysine triisocyanate (LTI); 4-isocyanatomethyl-1,8-octamethylene diisocyanate (NTI); or mixtures of these diisocyanates, and its mean number of —NCO functional groups ranges from 2.0 to 6.0.

In the case when polyisocyante (A) contains more than two —NCO functional groups, there are preferably used polyisocyanates—alone or in mixtures—such as are synthesized by trimerization, dimerization or formation of urethane, biuret or allophanate, as well as mixtures thereof with monomers. Such polyisocyanates or polyisocyanate/monomer mixtures may additionally have their chain extended or be branched if appropriate by means of difunctional or polyfunctional H-acid (protic) components such as diols, e.g., glycol, or polyols and/or diamines or polyamines.

Specific examples of suitable polyisocyantes (A) are disclosed in Stoye-Freitrag, Lackharze, Carl-Hanser-Verlag, 1996, pp. 191 ff., which is incorporated herein by reference.

As component (B) there are preferably used secondary 3-aminopropyl-trialkoxysilanes having the general formula (I)

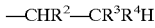

wherein R denotes an n-alkyl, isoalkyl, tert-alkyl, cycloalkyl or aryl group containing 1 to 10 carbon atoms and the groups denoted by $R^1$ can be, independently of one another, an n-alkyl or isoalkyl group containing 1 to 8 carbon atoms.

Preferred compounds are n-butyl-3-aminopropyltriethoxysilane, n-butyl-3-aminopropyltri-i-propoxysilane, methyl-3-aminopropyltriethoxysilane, methyl-3-aminopropyltri-i-propoxysilane, phenyl-3-aminopropyltriethoxysilane, phenyl-3-aminopropyltrimethoxysilane, phenyl-3-aminopropyltri-i-propoxysilane, cyclohexyl-3-aminopropyltriethoxysilane, cyclohexyl-3-aminopropyltrimethoxysilane, and cyclohexyl-3-aminopropyltri-i-propoxysilane.

In a further embodiment, R may also denote —$(CH_2)_3$—Si$(OR^1)_3$, wherein $R^1$ is as defined above.

Also suitable are secondary 3-aminopropyltrialkoxysilanes, such as are obtained by reaction of an aminopropyltrialkoxysilane with a compound containing an activated double bond (e.g., (meth)acrylic acid esters, (meth)acrylic acid nitrites, fumaric acid, or maleic acid esters) within the meaning of a pseudo Michael addition. Corresponding secondary 3-aminopropyltrialkoxysilanes and their products of reaction with isocyanates are described, for example, in U.S. Pat. No. 4,067,844, European Patent Application A 0596360, and European Patent Application A 0816326, which are incorporated herein by reference.

Thus, in formula I, R may also denote a group of general structure

with $R^2$=—H, C1 to C8 alkyl, —$CO_2R^1$;
with $R^3$=—H, methyl;
with $R^4$=—$CO_2R^1$, —CN,
wherein $R^1$ is as defined above.

In copending U.S. patent application Ser. No. 09/726,554, there is described the advantageous use of polyisocyanates modified with secondary aminosilanes in nonaqueous, thermosetting 2-component lacquers. As an advantage of these systems there is described an improved balance of acid resistance and resistance to mechanical stress and strain, such as scratch resistance.

Suitable as blocking agent (C) are blocking agents known in polyurethane technology, such as ketoximes; aldoximes; 1,2,4-triazoles, which may also be substituted; pyrazoles, which may also be substituted, especially 3,5-dimethylpyrazole; lactams, especially ε-caprolactam; CH-acid blocking agents from the group of malonic acid esters or acetic acid esters; phenols; substituted phenols; secondary amines, especially sterically hindered amines such as diisopropylamine; or C1 to C10 monohydric alcohols. For synthesis of the inventive silane-modified cross-linking agents, these blocking agents can be used in pure form, or else as mixtures. Preferred are oximes, caprolactam, 3,5-dimethylpyrazole or 1,2,4-triazole and secondary amines.

The inventive cross-linking agents are usually synthesized by modification of polyisocyanates. A less preferred technique, which nevertheless is also within the meaning of the present invention, is modification of monomeric diisocyanates with silane followed by conversion to the polyisocyanate and successive blocking.

Modification of the polyisocyanates can take place successively in the form of silanization followed by blocking or else blocking followed by silanization. A less preferred technique, which nevertheless is also within the meaning of the invention, is the reaction of polyisocyanate with a mixture of silane and blocking agent. In an especially preferred method, the polyisocyanate is first blocked and then silanized.

The synthesis can take place in solvents, which preferably are aprotic and anhydrous. Solvent-free synthesis methods using a stirred-reactor operation can be used provided the viscosity range of the products is suitable. If the products have relatively high viscosity, continuous synthesis in the reaction extruder is possible.

The inventive cross-linking agents are synthesized in the temperature range of 20° C. to 200° C., preferably 20 to 150° C.

If the reaction must be accelerated in certain circumstances, it is also possible to use catalysts that are standard in PUR technology, from the group comprising Sn(II), Sn(IV), Zn(II) and Bi compounds or tertiary amines or combinations of metal catalyst and tertiary amine.

The products can be obtained in pure form as liquids or solids, and if necessary can be dissolved in organic solvents for liquid lacquer applications.

The inventive cross-linking agents are used in thermosetting paints. These are composed substantially of cross-linking agents and polyol components, additives, if necessary, solvents, and organic or inorganic coloring pigments, fillers or dyes.

Accordingly, the subject matter also includes thermosetting paints which substantially contain at least one polyol component and the inventive cross-linking agents.

In this connection the inventive silane-modified blocked polyisocyanate may represent the sole cross-linking component of the thermosetting paints or may be used in combination with other cross-linking agents for hydroxyl-containing resins in thermosetting coatings, for example, from the group comprising the blocked polyisocyanates, the amiono resins such as melamine resins, benzoguanamine resins, glycoluril resins or urea resins (J. Ott in: Stoye-Freitag, Lacquer Resins, Carl-Hanser-Verlag, 1996, pp. 104 ff., which is incorporated herein by reference), or also from the group of triazine carbamates, as described for example in U.S. Pat. No. 5,084,541, which is incorporated herein by reference. In this connection, the silane-modified blocked polyisocyanate represents 10 to 100 parts by weight of the cross-linking agents, relative to nonvolatile constituents.

(Meth)acrylic copolymers, polyester polyols, polyester-urethane-group-containing polyols, polyether polyols and/or polycarbonate diols are suitable as polyol components to be cross-linked.

As hydroxyl-group-containing (meth)acrylic copolymers there can be used resins having a monomer composition such as described in, for example, International Patent WO 93/15849 (p. 8, line 25 to p. 10, line 5), or else in German Patent 19529124, which are incorporated herein by reference. For example, the (meth)acrylate copolymers may be copolymers containing (meth)acrylate esters and (meth)acrylate hydroxyalkylesters (e.g., 2-hydroxyethyl methacrylate and 2-hydroxypropyl methacrylate). In this connection, the acid number of the (meth)acrylic copolymer, which may be adjusted by proportional use of (meth)acrylic acid as the monomer, should be 0 to 30, preferably 3 to 15. The number-average molecular weight (determined by gel permeation chromatography versus a polystyrene standard) of the (meth)acrylic copolymer is preferably 2000 to 20000 g/mol, and the glass transition temperature is preferably −40° C. to +60° C. The hydroxyl content of the (meth)acrylic copolymer to be used according to the invention, which is to be adjusted by proportional use of hydroxyalkyl (meth)acrylates, is preferably 70 to 250 mg KOH/g, especially preferably 90 to 190 mg KOH/g.

Polyester polyols suitable according to the invention are resins with a monomer composition of dicarboxylic and polycarboxylic acids and diols and polyols, as described in, for example, Stoye/Freitag, Lacquer Resins, C. Hanser Verlag, 1996, p. 49, which is incorporated herein by reference, or else in International Patent WO 93/14849, which is also incorporated herein by reference. Polyaddition products of caprolactone and low molecular weight diols and triols, such as those available under the name TONE (Union Carbide Corp.) or CAPA (Solvay/Interox) can also be used as polyester polyols. The theoretical number-average molecular weight is preferably 500 to 5000 g/mol, especially preferably 800 to 3000 g/mol, and the average number of hydroxyl functional groups is 2.0 to 4.0, preferably 2.0 to 3.5.

Polyester-urethane polyols usable according to the invention in principle include those described in European Patent 140186, which is incorporated herein by reference. For example, suitable polyester-urethane polyols may be prepared by reacting an organic polyisocyanate with any of the polyester polyols described above (i.e., polyester polyols formed by reacting an organic polyearboxylic acid with a polyol). Preferred polyester-urethane polyols include those synthesized by reacting any of HDI, IPDI, trimethylhexamethylene diisocyanate (TMDI) or ($H_{12}$—MDI) with a polyester polyol. The number-average molecular weight is preferably 500 to 2000 g/mol, and the average number of hydroxyl functional groups is 2.0 to 3.5.

The weight ratio in which the cross-linking and polyol components are mixed ranges between 5:95 and 50:50, preferably between 20:80 and 40:60, relative to the weight of the nonvolatile constituents, depending on the desired property profile of the cured coating.

The inventive thermosetting paints may contain solvents well known in coatings technology, such as ketones, esters or aromatics, and adjuvants such as stabilizers, light-fastness agents, catalysts, leveling agents or rheological adjuvants, such as "sag control agents," microgels or pyrogenic silicon dioxide in typical concentrations.

As catalysts there are considered in particular those which have proved effective in the art of PUR technology, such as organic Sn(IV), Sn(II), Zn and Bi compounds or tertiary amines (PUR catalysts) in proportions of 0.1 to 2 wt %.

Latent sulfonic-acid-based catalysts, i.e., organic sulfonic acids neutralized by amines or covalent adducts of organic sulfonic acids with epoxy-containing compounds, such as described in particular in German Unexamined Patent Application DE-OS 2356768, which is incorporated herein by reference, are also suitable catalysts in proportions of 0.1 to 7 wt %.

Combinations of PUR catalysts and blocked sulfonic-acid-based catalysts are used particularly advantageously. The catalyst concentrations then amount to 0.01 to 0.5 wt % of PUR catalyst and 0.1 to 7 wt % of sulfonic-acid-based catalyst, relative to nonvolatile organic constituents. This embodiment is an especially preferred version of the present coating compositions.

If necessary, inorganic or organic coloring and/or effect pigments that are standard in lacquer technology may also be incorporated.

Paints based on the inventive cross-linking agents may represent solvent-containing, aqueous, so-called aqueous powder-slurry systems or else powder paints.

The paints based on the inventive cross-linking agents may be applied by known methods such as spraying, dipping, rolling or doctoring. In this connection, the substrate to be coated may already be coated with further coating layers.

The paints are also suitable for use as clear coats, in which case it is applied in the so-called wet-in-wet process on one or more base coating layers, and these are then cured at the same time.

Curing of the inventive paints takes place in the temperature range of 110 to 250° C. (temperature of the article).

Other features of the invention will become apparent in the course of the following descriptions of exemplary embodiments which are given for illustration of the invention and are not intended to be limiting thereof.

EXAMPLES

In the following Examples, the quantity values refer to weight.

Example 1

Comparison

Synthesis of a Polyisocyanate Blocked with 1,2,4-triazole 728.3 parts of VESTANAT T 1890/100 (polyisocyanate based on IPDI) was dissolved in 623.7 parts of Solvesso 100 at 40° C., mixed with 207.3 g of triazole and heated to 90° C. After 5 hours of stirring at 90° C. there was formed a clear solution. The free NCO content of the solution had decreased to 0.3%, or in other words almost complete reaction of the NCO groups had been achieved. After about 12 hours at room temperature, considerable quantities of a white solid crystallized out. Even by dilution with Solvesso 100 such that the solids content was 50%, 40% or 30%, it was not possible to obtain a clear solution.

Example 2

Synthesis of an Inventive Cross-linking Agent Using 1,2,4-triazole 485.6 parts by weight of Vestanat T 1890/100 (Degussa-Hüls AG) was dissolved in 506 parts by weight of Solvesso 100. This was mixed with 82.9 parts by weight of 1,2,4-triazole and 0.38 parts by weight of DBTL, heated to 90° C. and stirred for 3 hours at this temperature. The clear solution was cooled to 40° C. and mixed with 190.4 parts by weight of DYNASYLAN 1189 within 30 minutes. After 2 hours of stirring at 40° C. the reaction was complete, no further viscosity increase was noted and the NCO content was less than 0.1 wt %. The solution remained clear even after prolonged storage at room temperature.

Viscosity: 9,960 mPas (23° C.).

In contrast to Comparison Example No. 1, Example No. 2 shows that the solubility and compatibility of cross-linking resins can be significantly improved by modification with silane according to the invention.

Example 3

Synthesis of a Silane-Modified Polyisocyanate Blocked with 2-butanone Oxime (According to the Invention).

681.6 parts of Desmodur N 3300 (Bayer AG, isocyanurate of HDI) was dissolved in 288.7 parts of Solvesso 100 and mixed with 184.7 parts of 2-butanone oxime at 40° C. within 1 hour with cooling. After one further hour, the NCO content had decreased to 5.14%, meaning that complete reaction of the oxime had occurred. The mixture was diluted with 111.1 parts of Solvesso 100, after which 333.2 parts of DYNA-SYLAN 1189 was added continuously for 30 minutes. The reaction was complete after 1 hour. The degree of silanization was 40 mol % of the NCO groups of the starting polyisocyanate.

Characteristic data: Nonvolatile constituents: 75%; viscosity (25° C.): 2700 mPas; NCO content:<0.1%

Examples 4 to 8

Composition of Thermosetting Paints Based on Inventive Cross-linking Agents (Examples 5 to 7) and Comparison Examples 4 and 8

Spray-painting paints were prepared by mixing the components listed in Table 1 until they were completely homogeneous. The viscosity, determined as the runout time in the DIN 4 beaker at 23° C., was about 20 seconds.

TABLE 1

Composition of thermosetting paints

| | Example | | | | |
|---|---|---|---|---|---|
| | No. 4 | No. 5 | No. 6 | No. 7 | No. 8 |
| Desmodur BL 3175 (Bayer AG, Germany) | 26.2 | | | | |
| Polyisocyanate per example 2 | | | | 11.5 | |
| Polyisocyanate per example 3 | | 34.2 | 24.3 | | |
| Macrynal SM 510 N (Vianova Resins, Austria) | 43.1 | 28.0 | 33.2 | | |
| Setalux C 1757 (Akzo Resins) | | | | 40.3 | 51.3 |
| Setamin US 138 BB70 (Akzo Resins) | | | | 12.1 | 22.0 |
| DBTL (10%) | 4.6 | 4.2 | 3.8 | 4.3 | |
| Dynapol catalyst 1203 (Degussa-Hüls AG) | | | | 2.2 | 1.5 |
| Butyl acetate | 9.5 | 14.0 | 16.5 | 10.1 | 5.1 |
| Xylene | 9.6 | 13.9 | 16.5 | 10.9 | 9.7 |
| Tinuvin 292 (CIBA) | 0.5 | 0.5 | 0.5 | 0.6 | 0.5 |
| Tinuvin 1130 (CIBA) | 0.7 | 0.7 | 0.7 | 0.8 | 0.7 |
| Butyl glycol acetate | | | | 2.0 | 2.6 |
| Butoxyl | | | | | 1.5 |
| Baysilon OL 17 (10%) | | | | | 5.1 |
| BYK Spezial | 3.6 | 2.5 | 2.5 | | |
| BYK 333 (BYK-Chemie, Germany) (10%) | | | | 2.6 | |
| BYK 331 (BYK-Chemie, Germany) (10%) | 2.2 | 2.0 | 2.0 | | |
| BYK OK (BYK-Chemie, Germany) | | | | 2.6 | |

To test the scratch resistance, the clear lacquers were applied by spraying in a wet-in-wet process onto a black base coat (Permacron, Spies Hecker Co., application by spraying, air exhausted for 10 minutes at ambient temperature). After air was exhausted for 5 minutes, curing took place for 25 minutes at 140° C. The layer thickness of the dried film of clear coat was about 35 μm. The scratch resistance was determined after 14 days of storage at ambient temperature.

To evaluate the acid resistance, clear coats were applied by the above process on a silver metallic base coat (STANDOX VWL 97A, diamond silver of the Herberts Co.) on so-called gradient-furnace sheets (BYK-Gardner) and cured.

Mechanical characteristics and general resistance properties were determined for one-layer clear coats, applied on phosphated steel sheets (Bonder 26) and cured for 25 minutes at 140° C.

Scratch Resistance Test

A 45 mm×20 mm nylon fabric with mesh width of 31 μm is weighed down by means of a 2-kg weight on the test plate, which itself is fixed on a slide, positioned and immobilized. After application of 1 ml of a stirred, 0.25% detergent solution (Persil) directly in front of the test surface, the test plate is oscillated with a maximum deflection of about 3.5 cm in each direction. After 80 forward and back movements (1 per second), the remaining detergent fluid is rinsed off with tap water and the plate is dried with compressed air. Gloss measurements (at 20° angle) are made before and after the test.

Recovery (Reflow) Under Temperature Influence

The damaged test plate is stored for 2 h at 60° C. in a circulating-air oven, after which the gloss of the coating is measured once again.

Acid Resistance Test

Drops (about 0.25 ml) of 20% sulfuric acid solution are applied at a spacing of 2 cm on the test sheets by means of a pipette. Thereafter they are subjected for 30 minutes in a temperature-gradient oven (BYK-Gardner) to a temperature gradient of 35 to 80° C. in the long direction of the sheet. Acid residues are then washed away with water and a visual inspection is performed 24 hours later. For evaluation, the resistance is expressed as the range (temperature) in ° C. in which visible etching of the clear lacquer and visible destruction of the base coat first become apparent. A higher temperature means a correspondingly higher resistance of the clear lacquer.

TABLE 2

Mechanical characteristic data, acid resistance, scratch resistance of cured clear coats

| | Example | | | | |
|---|---|---|---|---|---|
| | No. 4 | No. 5 | No. 6 | No. 7 | No. 8 |
| Layer thickness (μm) | 30 | 30 | 33 | 35 | 28 |
| Hardness, König (s) | 192 | 195 | 196 | 167 | 154 |
| Erichsen indentation (mm) | 8.5 | 7.0 | 7.5 | 7.0 | 5.5 |
| Ball impact, direct (inch*lbs) | >80 | >80 | >80 | 40 | 40 |
| Resistance to super gasoline | Very good | Very good | Very good | Very good | Very good |
| Resistance to MEK wiper fluid (forward and back movements) | >150 | >150 | >150 | >150 | >150 |
| Acid resistance: | | | | | |
| Etching of clear lacquer at ° C. | 55 | 45 | 49 | 48 | 36 |
| Destruction of base coat at ° C. | 63 | 57 | 53 | 67 | 46 |
| Scratch resistance: | | | | | |
| Initial gloss, 20° | 84.6 | 79.1 | 80.7 | 84.8 | 83.6 |
| Gloss difference after test, 20° | 33.5 | 27.9 | 35.3 | 38.5 | 15.0 |
| Gloss difference relative to initial gloss after reflow (60° C.), 20° | 20.8 | 1.5 | 2.3 | 12.8 | 7.1 |

Compared with the Comparison Example (No. 4) having almost the identical profile of mechanical characteristics and comparable acid resistance, Examples 5 and 6 exhibit significantly improved reflow behavior. Compared with the reference example corresponding to pure melamine resin cross-linking (Example No. 8), the use of cross-linking agent No. 2, silanized and blocked with 1,2,4-triazole according to the invention exhibited, for similar gloss values after the reflow test, a significantly improved acid resistance with respect to etching both of the clear lacquer and of the base coat.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

What is claimed as new and desired to be secured by Letters Patent of the United States is:

1. A cross-linking agent formed from the following starting components:
   (A) at least one aliphatic and/or cycloaliphatic polyisocyanate compound having ≧2 to 6 NCO function groups, obtained by trimerization, dimerization or formation of, biuret or allophanate, alone or in mixtures, and excluding polyisocyanates obtained from bis(4-isocyanatocyclohexyl)-methane;
   (B) at least one secondary 3-aminopropyltrialkoxysilane, wherein 1 to 90 mol % of the originally free isocyanate groups of said polyisocyanate have been reacted with said secondary 3-aminopropyltrialkoxysilane;
   (C) at least one blocking agent, wherein 10 to 99 mol % of the originally free isocyanate groups of said polyisocyanate have been reacted with said blocking agent, and the molar proportions of the reacted isocyanate groups add up to at least 95 mol %.

2. The cross-linking agent of claim 1, wherein said polyisocyanate is based on a diisocyanate selected from the group consisting of hexamethylene diisocyanate; isophorone diisocyanate; tetramethylxylylene diisocyanate; 1,3-bis (isocyanatomethyl)cyclohexane; 2,2,4-trimethyl-1,6-diisocyanatohexane; 2,4,4-trimethyl-1,6-diisocyanatohexane; 2-methylpentene diisocyanate-1,5; norbornyl diisocyanate; lysine triisocyanate; 4-isocyanatomethyl-1,8-octamethylene diisocyanate; and mixtures thereof.

3. A process for preparing a cross-linking agent, said process comprising reacting (A) at least one aliphatic and/or cycloaliphatic polyisocyanate compound having ≧2 to 6 NCO function groups, obtained by trimerization, dimerization or formation of biuret or allophanate, alone or in mixtures, and excluding polyisocyanates obtained from bis (4-isocyanatocyclohexyl)-methane, with
   B) at least one secondary 3-aminopropyltrialkoxysilane, wherein 1 to 90 mol % of the originally free isocyanate groups of said polyisocyanate have been reacted with said 3-aminopropyltrialkoxysilane; and
   C) at least one blocking agent, wherein 10 to 99 mol % of the originally free isocyanate groups of said polyisocyanate have been reacted with said blocking agent, and wherein the molar proportions of the reacted isocyanate groups add up to at least 95 mol %.

4. The cross-linking agent of claim 1, wherein said polyisocyanate is a mixture of a polyisocyanate and a monomeric diisocyanate.

5. The cross-linking agent of claim 1, wherein said polyisocyanate has had its chain extended or is branched.

6. The cross-linking agent of claim 1, wherein said secondary 3-aminopropyltrialkoxysilane has the general formula I

R—NH—(CH$_2$)$_3$—Si(OR$^1$)$_3$     (I)

wherein R denotes a n-alkyl, isoalkyl, tert-alkyl, cycloalkyl, or aryl group with 1 to 10 carbon atoms and the groups denoted by R$^1$ can be, independently of one another, an n-alkyl or isoalkyl group with 1 to 8 carbon atoms.

7. The cross-linking agent of claim 6, wherein said secondary 3-aminopropyltrialkoxysilane is selected from the group consisting of n-butyl-3-aminopropyltriethoxysilane, n-butyl-3-aminopropyltri-i-propoxysilane, methyl-3-aminopropyltriethoxysilane, methyl-3-aminopropyltri-i-propoxysilane, phenyl-3-aminopropyltriethoxysilane, phenyl-3-aminopropyltrimethoxysilane, phenyl-3-aminopropyltri-i-propoxysilane, cyclohexyl-3-aminopropyltriethoxysilane, cyclohexyl-3-aminopropyltriethoxysilane, cyclohexyl-3-aminopropyltri-i-propoxysilane, and mixtures thereof.

8. The cross-linking agent of claim 1, wherein said secondary 3-aminopropyltrialkoxysilane has the general formula I $$R-NH-(CH_2)_3-Si(OR^1)_3 \quad (I)$$

wherein R is $-(CH_2)_3-Si(OR^1)_3$ and the groups denoted by $R^1$ can be, independently of one another, an n-alkyl or isoalkyl group with 1 to 8 carbon atoms.

9. The cross-linking agent of claim 1, wherein said secondary 3-aminopropyltrialkoxysilane has the general formula I $$R-NH-(CH_2)_3-Si(OR^1)_3 \quad (I)$$

wherein R has the structure $$-CHR^2-CR^3R^4H$$

with $R^2=-H$, Cl to C8 alkyl, $-CO_2R^1$;
with $R^3=-H$, methyl;
with $R^4=-CO_2R^1$, $-CN$,
and the groups denoted by $R^1$ can be, independently of one another, an n-alkyl or isoalkyl group with 1 to 8 carbon atoms.

10. The cross-linking agent of claim 1, wherein said blocking agent is selected from the group consisting of ketoximes, aldoximes, substituted and unsubstituted 1,2,4-triazoles, substituted and unsubstituted pyrazoles, 3,5-dimethylpyrazole, ε-caprolactam, malonic acid esters, acetic acid esters, phenol, substituted phenols, secondary amines, C1 to C10 monohydric alcohols, and mixtures thereof.

11. A cross-linking agent, prepared by a process, said process comprising reacting (A) at least one aliphatic and/or cycloaliphatic polyisocyanate compound having ≧2 to 6 NCO function groups, obtained by trimerization, dimerization or formation of biuret or allophanate, alone or in mixtures, and excluding polyisocyanates obtained from bis (4-isocyanatocyclohexyl)-methane, with B) at least one secondary 3-aminopropyltrialkoxysilane, wherein 1 to 90 mol % of the originally free isocyanate groups of said polyisocyanate have been reacted with said 3-aminopropyltrialkoxysilane; and C) at least one blocking agent, wherein 10 to 99 mol % of the originally free isocyanate groups of said polyisocyanate have been reacted with said blocking agent, and wherein the molar proportions of the reacted isocyanate groups add up to at least 95 mol %.

* * * * *